Figure 1:
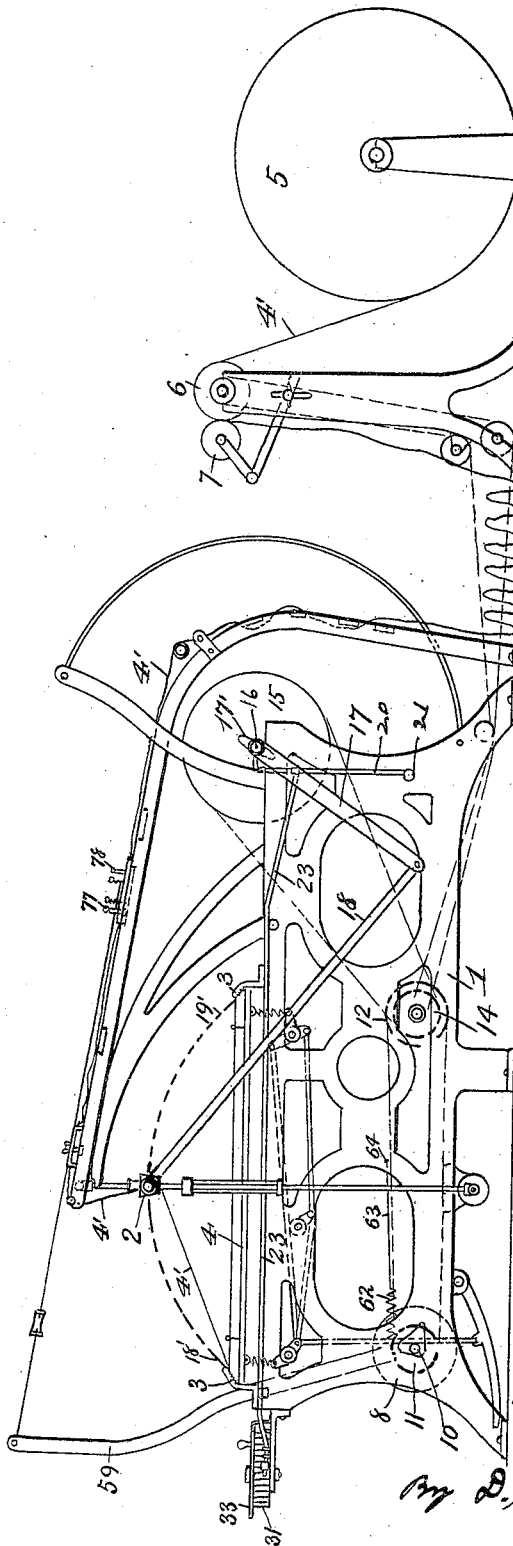

K. VON THIGPEN.
MEASURING ATTACHMENT FOR CLOTH FOLDING MACHINES.
APPLICATION FILED JUNE 9, 1908.

942,685.

Patented Dec. 7, 1909.
6 SHEETS—SHEET 1.

Witnesses
J. L. Ourand
W. Parker Reinohl

Inventor
Kit Von Thigpen.
By D. P. Reinohl
Attorney

K. VON THIGPEN.
MEASURING ATTACHMENT FOR CLOTH FOLDING MACHINES.
APPLICATION FILED JUNE 9, 1908.

942,685.

Patented Dec. 7, 1909.
6 SHEETS—SHEET 4.

Witnesses
F. L. Ormand
W. Parker Rinehl.

Inventor
Kit Von Thigpen.

By D. R. Rinehl.
Attorney

K. VON THIGPEN.
MEASURING ATTACHMENT FOR CLOTH FOLDING MACHINES.
APPLICATION FILED JUNE 9, 1908.

942,685.
Patented Dec. 7, 1909.
6 SHEETS—SHEET 5.

Witnesses
Inventor
Kit Von Thigpen
By D. C. Reinohl
Attorney

UNITED STATES PATENT OFFICE.

KIT VON THIGPEN, OF GREENSBORO, NORTH CAROLINA, ASSIGNOR OF ONE-THIRD TO THE PROXIMITY MANUFACTURING COMPANY AND ONE-THIRD TO RANSOM F. THIGPEN, BOTH OF GREENSBORO, NORTH CAROLINA.

MEASURING ATTACHMENT FOR CLOTH-FOLDING MACHINES.

942,685.     Specification of Letters Patent.     Patented Dec. 7, 1909.

Application filed June 9, 1908. Serial No. 437,469.

*To all whom it may concern:*

Be it known that I, KIT VON THIGPEN, a citizen of the United States, residing at Greensboro, in the county of Guilford and State of North Carolina, have invented certain new and useful Improvements in Measuring Attachments for Cloth-Folding Machines; and I do hereby declare the following to be a full, clear, and exact description of the invention, such as will enable others skilled in the art to which it appertains to make and use the same.

My invention relates primarily to cloth folding machines, has especial reference to an attachment for measuring the cloth folded and indicating the yardage thereof at each fold of the cloth made by the machine.

In the prevailing practice of measuring cloth on folding machines, the cloth is measured by a revoluble member engaging the surface of the cloth as it travels toward the folding device, which practice is unsatisfactory and unreliable for obvious reasons, such as differences in the tension under which the cloth is traveling, and differences in the texture of the fabric. To guard against this serious defect, the folds of the cloth have been counted by an attendant, and the yardage computed by the number of folds and the length of the cloth in each fold, but this has not given satisfaction, for the reason that the monotony attending the counting of the folds results in miscounts, and as a consequence the yardage of the bolt of cloth is not readily ascertained. Furthermore, when the attention of the attendant is required to count the folds of the machine, an additional attendant is required to care for the cloth after it has been removed from the folding machine.

It is my purpose to correctly ascertain the yardage of a bolt of cloth by measuring each fold of the machine and indicating the same on a device attached to and operated by the folding machine, and to dispense with the services of the additional attendant.

The invention consists in certain improvements which will be fully disclosed in the following specification and claims.

Figure 2:
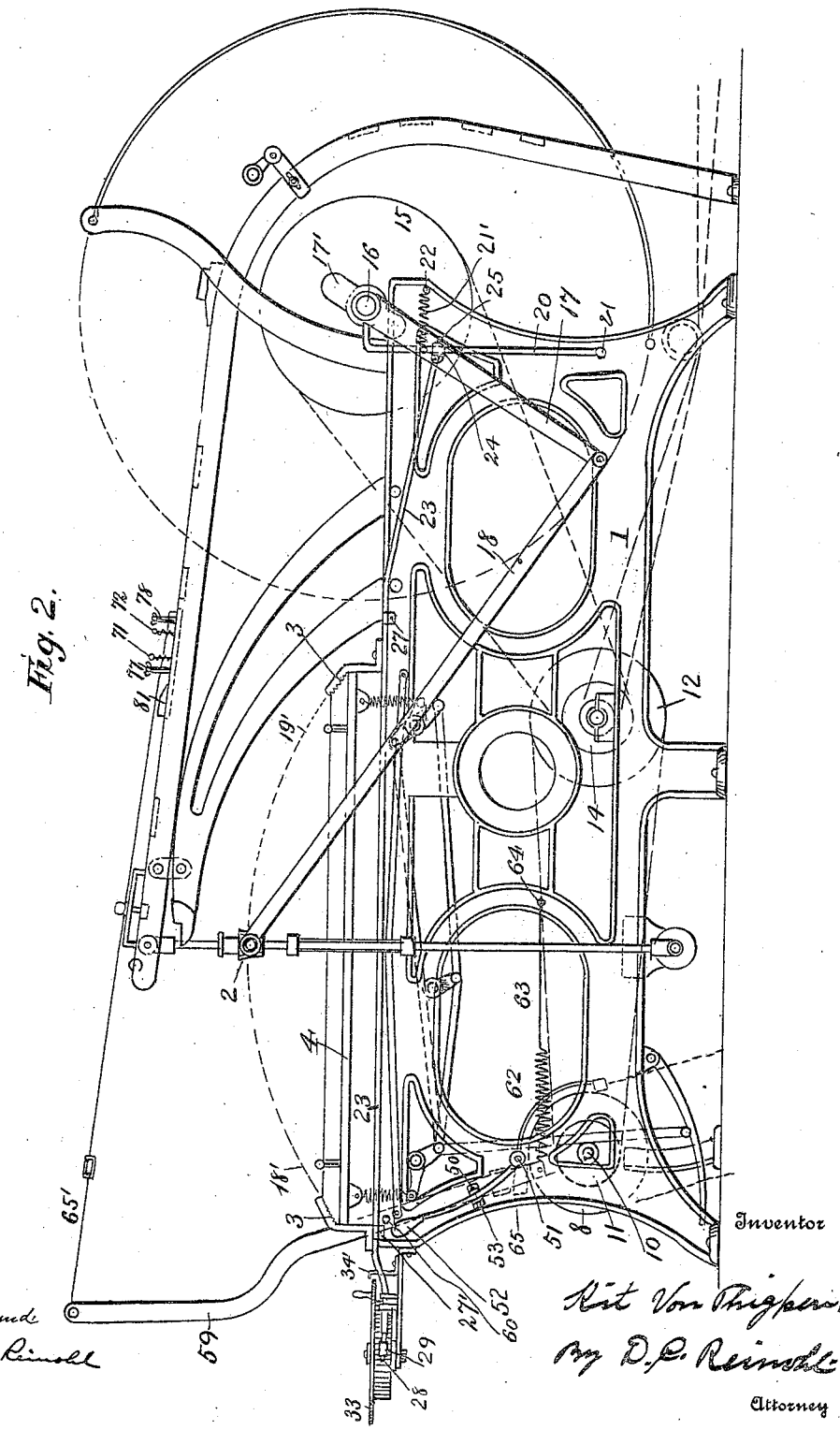
Figure 3:
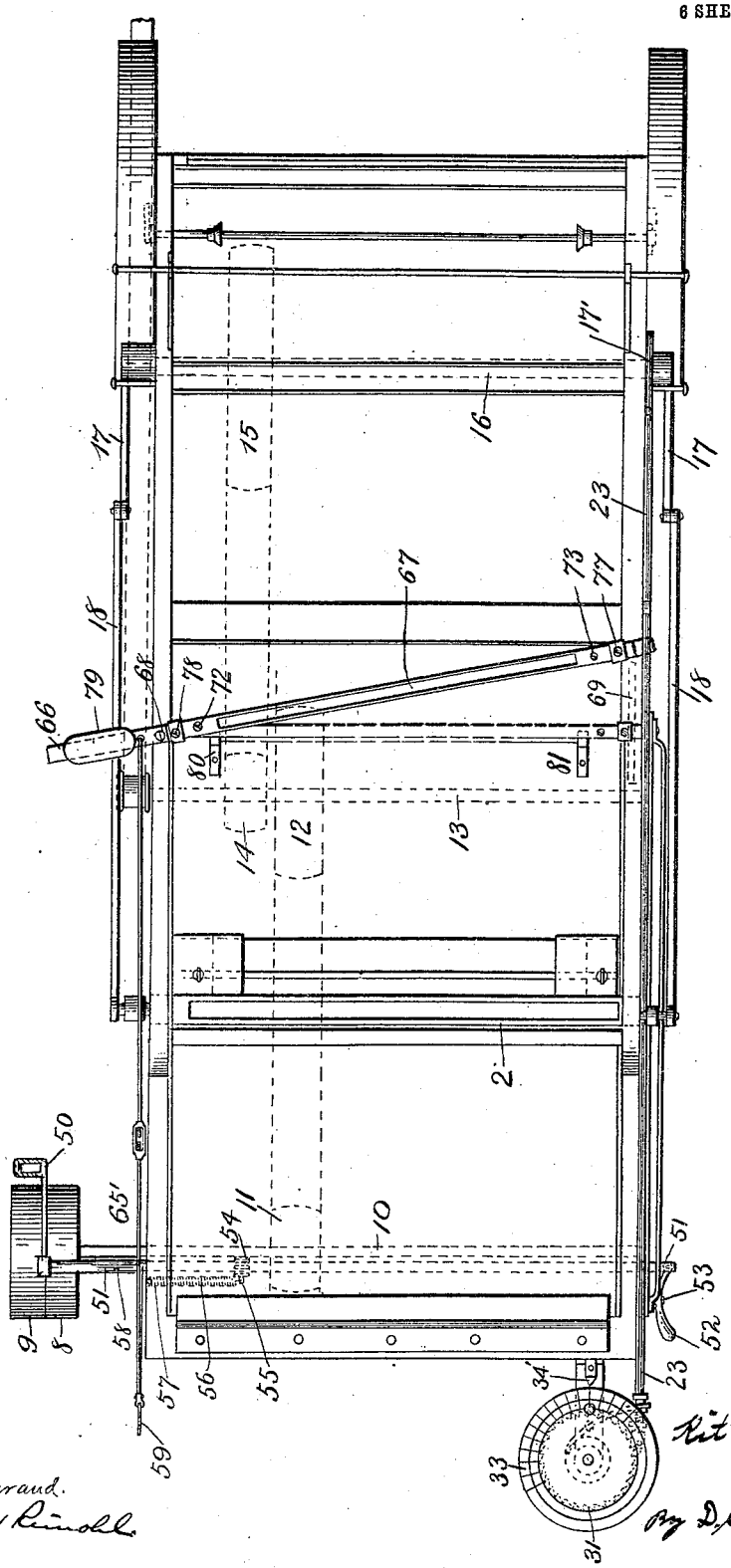
Figure 4:
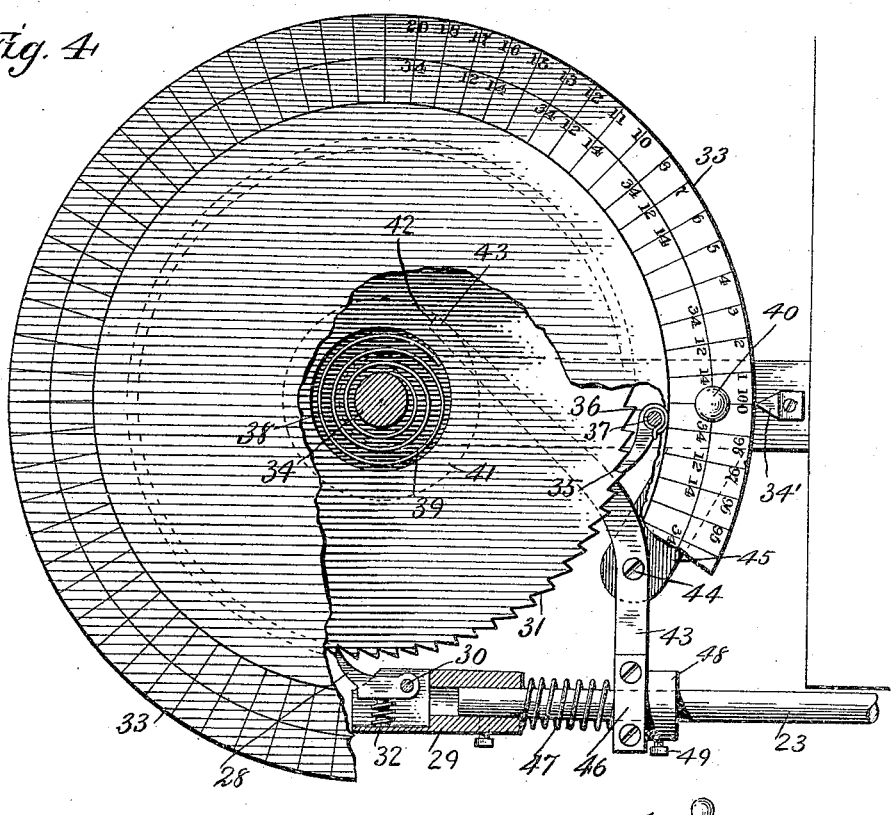
Figure 5:
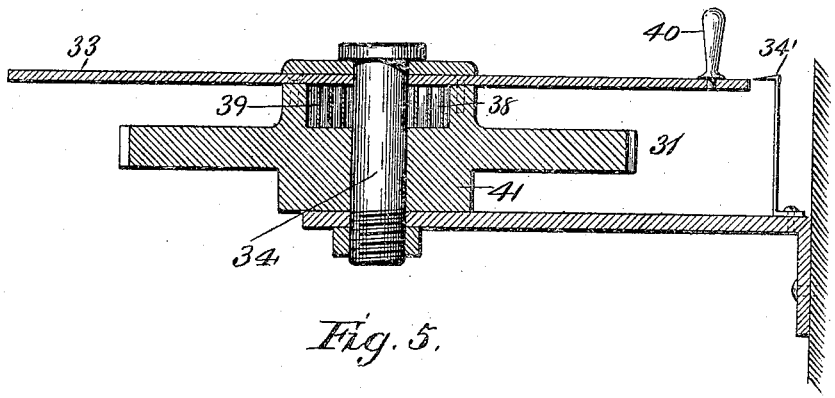
Figure 6:
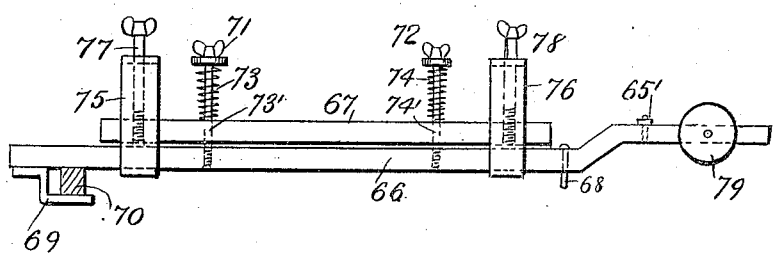
Figure 7:
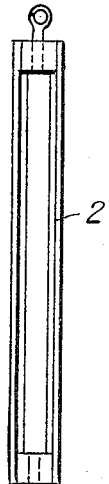
Figure 8:
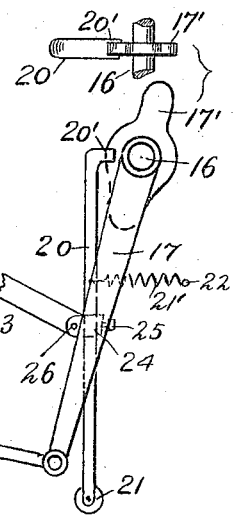

In the accompanying drawings, which form part of this specification: Figure 1 represents a side elevation of a cloth folding machine provided with my measuring attachment. Fig. 2 a like view on an enlarged scale, the roll for the cloth and its appertenances being omitted. Fig. 3 a top plan view of the same. Fig. 4 a top plan view partly in section and on an enlarged scale, showing the indicating device. Fig. 5 a vertical section of the same, partly in elevation. Fig. 6 a side elevation of the clamp or stop motion on an enlarged scale. Fig. 7 a top plan view and transverse section of the cloth guide or carrier detached. Fig. 8 a side elevation and top plan of the cam, its shaft and crank-arm for operating the indicating device, detached and Fig. 9 an end elevation of the machine on an enlarged scale.

Reference being had to the drawings and the designating characters thereon, the numeral 1 indicates a cloth folding machine, 2 the cloth guide or carrier, 3, 3, the jaws for holding the folds of cloth, 4 the plate for supporting the cloth 4', 5 the roll from which the cloth is supplied to the machine, 6 the roller over which the cloth passes from the roll 5, 7 the tension device, 8 and 9 Fig. 3 are respectively tight and loose pulleys on main shaft 10 by which the machine is driven.

11 is a pulley on main shaft 10 driving pulley 12 on counter shaft 13, 14 is a pulley on counter shaft 13 driving pulley 15 on cam shaft 16. On the cam shaft 16 is a crank-arm 17 connected by rod 18 with cloth guide or carrier 2, and controlling the throw of the machine, all of which parts are well known and form no part of my present invention.

The cloth guides 2 describe the arc 18' to 19' as the crank arm 17 revolves, and the chord of said arc is equal to the diameter of the circle described by the crank arm 17 in its revolution, and measures each single fold of the cloth. Therefore, each half revolution of the cam shaft 16 makes one fold of cloth of twice the length of the crank-arm 17, and the indicator indicates the number of folds in the cloth, and shows the exact yardage of cloth folded. This indicating is accomplished by the following devices. On the crank shaft 16 is a double cam 17' Figs. 2 and 8 of shape indicated in the drawings. The long axis of this cam, when in position, is parallel with the crank arm 17. In juxtaposition with cam 17' is the cam lever 20, pivoted on the stud 21, fixed to the frame of the machine. The upper end of the cam lever 20 is notched or forked at its end 20' as shown in Fig. 8, so as to fit over the sides of the cam 17' and prevent lateral displacement. The cam lever 20 is held in constant contact with the cam 17' by the spring 21', which is fastened to the frame of the machine at 22. The cam lever 20 is connected with the indicator at the front of the machine by the indicator rod 23. The indicator rod 23 is fastened to the cam lever 20 by means of the sleeve 24, this sleeve is adjustable to slide up or down the cam lever 20, being held in position when adjusted by the set screw 25. The indicator rod 23 is fastened in the sleeve 24 by the pin 26. By raising the sleeve 24 on the cam lever 20, the throw of the indicator rod 23 is lengthened, and by lowering the sleeve the throw of the rod 23 is shortened. The indicator rod 23 is held in position by the sleeve brackets 27 and 27' Fig. 2 fastened to the frame of the machine, and moves freely forward and backward in these sleeve brackets. At the forward end of the indicator rod 23 is the pawl 28, Figs. 2 and 4 and the pawl case 29, the pawl is pivoted on a vertical pin 30 in the pawl case and held against the ratchet 31 by spring 32. Above the ratchet 31 is the indicator plate 33, which is secured to the ratchet 31 and moves with it on the stud 34, and carries the graduated indicator plate 33 around beyond the index finger 34' so as to indicate the exact yardage in one fold of the cloth. The number of teeth in the ratchet 31 and the number of yards indicated on the indicator plate 33 are determined by the length of the crank arm 17.

When the crank 17 is 18 inches in length, each fold is one yard long. The yards indicated on the graduated indicator plate 33 must then coincide with the number of teeth in ratchet 31. That is to say, if the indicator plate is gaged to show 100 yards, there must be 100 teeth in the ratchet. When, however, as in many standard folding machines, the crank 17 is 22½ inches long, making a fold of 1¼ yards, the ratchet must be made with 80 teeth where the indicator plate is gaged for 100 yards. In every case, the number of yards shown by one complete revolution of the indicator plate must be divided by the length (in yards) of each fold to get the number of teeth in the ratchet. The ratchet 31 after being advanced by the pawl 28 is held from slipping back by the pawl 35 and spring 36 on the stud 37. Inasmuch as advancing the ratchet one tooth advances the indicator plate to show one exact fold of the cloth, it is important that with each tooth advanced, the ratchet 31 and plate 33 remain snugly at the exact point to which advanced. Otherwise, if the pawl 35 slid forward on the next tooth, it would register more than the yardage of the one fold. To effect this a volute coiled spring 38 is fastened to the stud 34, and presses against the wall of the opening 39 in the ratchet, holding it back firmly against the pawl. The ratchet and indicator plate advance in only one direction (as they cannot revolve back against the pawl 35). They can be moved forward to the zero point by the handle 40 on the indicator plate 33 when a new piece of cloth is to be folded.

The indicator plate 33 is graduated and the graduations numbered consecutively according to the length of each fold of the machine.

To facilitate the operator in bringing the zero point of the indicator plate 33 opposite the index finger 34', a stop motion is arranged in connection with the ratchet 31 as follows: The ratchet 31 is cast in one piece with the hub 41, this hub contains a notch 42 Fig. 4 into which the curved finger 43 fits when the zero point on the indicator plate 33 is opposite the index finger, holding the ratchet and indicator plate in position so that it will not move in either direction. The finger 43 is pivoted at 44 on the arm 45 and extends out so that the indicator rod 23 passes through it at 46. The spring 47 is wound around the end of the indicator rod 23 resting against the pawl case 29, and pushes one end of the curved finger 43 backward so that the other end of the curved finger 43 is kept in constant contact with the hub 41, and enters the notch 42 when the zero point is reached. This stop motion on the indicator plate is only for use in bringing the plate to the zero point when the machine is at rest before starting to measure a fresh piece of cloth. In order to keep this stop motion from working when the machine is in operation (in case it be desired to pass the zero point with a long piece of cloth) the collar 48 is fastened to the indicator rod 23 with a set screw 49, and is adjusted so that each time the indicator arm moves forward, the collar 48 pushes the outer end of the curved finger 43 forward, thus taking the inner end of the curved finger out of contact with the hub 41 and away from the notch 42.

As the indicator plate continues to register so long as the machine continues in motion, it is necessary to have the machine stop the moment the end of each piece of cloth is reached. To accomplish this, a stop motion is arranged as follows; the cloth being folded is run through the machine from a cylindrical roll 5 at one end of the machine. This roll is composed of a number of pieces or "cuts" of cloth, as they are called, sewed together to make a continuous roll. The stop motion is operated by means of the seam at the end of each cut of cloth catching against two parallel rods or bars through which the cloth passes, and causing the belt lever to shift the belt from the tight to the loose pulley on the main or driving shaft of the machine.

The details of the stop motion are as follows: When the machine is at rest, the belt is on the loose pulley 9, at the outside of the left hand side of the machine, the belt passes through a belt shifter 50 fixed to a movable rod 51 which passes through bearings in the frame of the machine from the left side to the right. On the right hand side of the machine the rod 51 is connected with the hand operated stop and starting lever 52, fulcrumed on the pivot 53 fastened to the frame of the machine. By pushing this lever inward (from right to left) the rod 51 is pulled from left to right, the belt shifted to the tight pulley and the machine started, conversely, by pushing the lever out (from left to right), the rod 51 is pushed from right to left, the belt shifted to the loose pulley and the machine stopped. The stop motion works automatically by pulling the rod 51 from right to left and thus shifting the belt to the loose pulley the moment the seam strikes the iron rods above mentioned. This is done as follows: On the rod 51 is fixed a collar 54, held in position by a set screw 55, a spring 56 is fastened to this collar and to the frame of the machine at 57, and is constantly pulling the rod 51 in the direction from right to left so as to shift the belt to the loose pulley. It would do so but for the fact that a notch 58 is cut in the rod 51 into which fits the vertical lever 59, when the machine is in motion, thus holding the rod 51 in position with the belt on the tight pulley. The lever 59 is pivoted on the stud 60 Figs. 2 and 9 fixed to the frame of the machine, and is held in constant contact with the rod 51 by the spring 62 and rod 63 fastened to the frame of the machine at 64.

Figure 9:
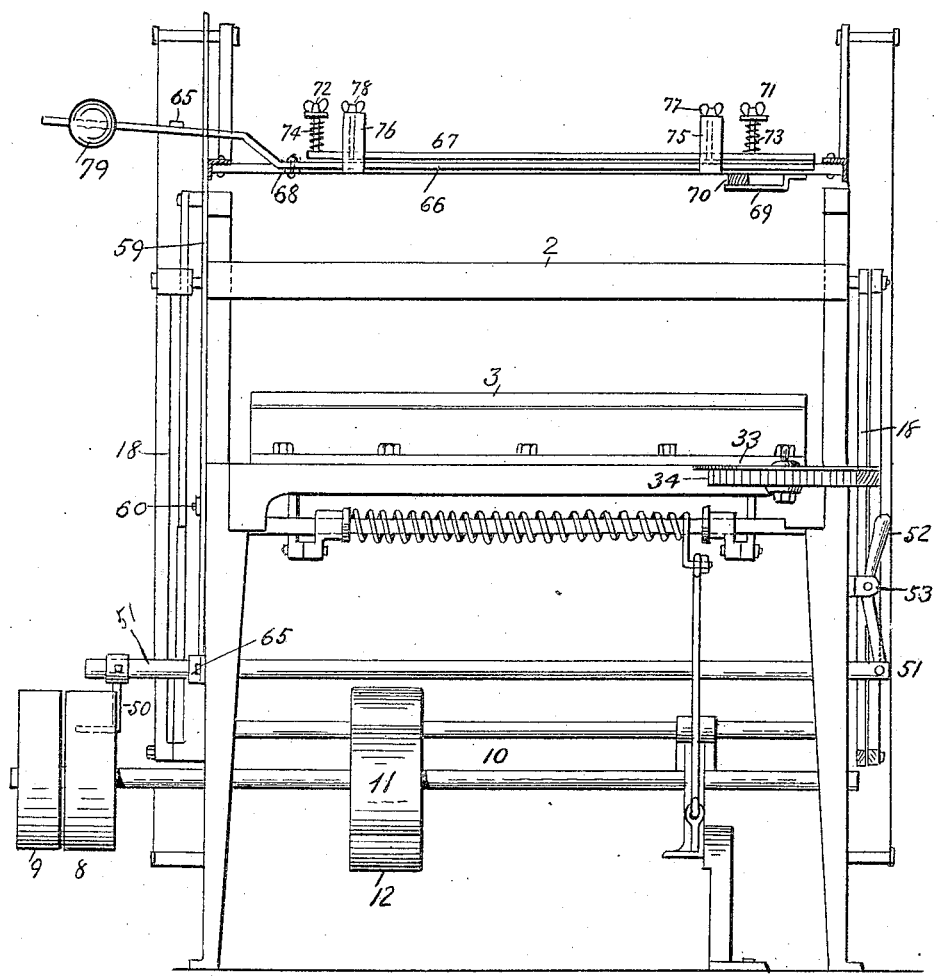

A bracket 65 Figs. 2 and 9 on the frame prevents lateral displacement of the vertical lever 59. At the upper end of the vertical lever 59, a rod 65' connects it with the lower of the parallel bars 66 and 67. The bar 66 is pivoted on the top of the frame of the machine at the left side by the stud 68; it extends across the top of the machine at an angle of 10 or 15 degrees, and is kept from rising by the bracket 69 which slides along the bar 70 fixed into the top of the frame of the machine. The upper bar 67 is held in position above the bar 66 by means of the thumb screws 71 and 72 and the springs 73 and 74. The thumb-screws 71 and 72 pass through holes 73', 74' in the bar 67, and the springs 73 and 74 pressing against the top of bar 67 and head of the thumb-screw, tend to hold bars 66 and 67 in contact. To prevent bars 66 and 67 remaining in actual contact and leave space enough between them for cloth to pass through, the vertical brackets 75 and 76 are fastened to the lower bar 66, through the top of these brackets pass the thumb screws 77 and 78, which are threaded through the upper bar 67 and rest against the top of the lower bar 66. By turning these thumb-screws so that they protrude through the bar 67, the space between bars 66 and 67 can be regulated to accommodate the thickness of the cloth that must pass through them to be folded. On one end of bar 66 is a weight 79 to balance the weight of the bars and prevent their swinging forward too easily on the stud 68.

On the top of the frame are wedges 80 and 81, so adjusted as to strike the space between bars 66 and 67 and force them apart when the latter are pulled forward.

The operation of the stop motion is as follows: When the machine is in motion, the cloth passes through the space between bars 66 and 67. This space is regulated by thumb screws 77 and 78 to accommodate the thickness of the particular cloth folded. It allows the cloth to pass through freely but not the extra thickness caused by the seam where one "cut" is sewed to another, when this seam is reached, the forward motion of the cloth (propelled by the folding guides 2) pulls the bars 66 and 67 forward on the stud 68, this causes the left (or weight end) of the bar 66 to be pulled backward, and by means of the connecting rod 65' pulls the upper end of the vertical lever 59 forward. The lever 59 being pivoted on the stud 60, the lower end is thus easily pulled backward and slips out of the notch 58 in the connecting rod 51. This rod being released, the spring 56 pulls the rod 51 from right to left and shifts the belt to the loose pulley. When the machine is again started, the stop and starting lever 52 is pushed from right to left. This pulls the rod 51 from left to right, bringing the belt to the tight pulley and the notch 58 opposite the vertical lever 59. The spring 62 pulls the lever 59 into the notch 58 and the machine is set for a new run. Now when the seam in the cloth catches the bars 66 and 67, it pulls them forward and stops the machine because the seam cannot get through the bars, but having performed its work and stopped the machine, the seam is at once released by the bars 66 and 67 being pulled forward upon the wedges 80 and 81, which entering between the bars separate them and allow the seam to pass through.

The parts of the machine shown for discharging the folded cloth, being well known and forming no part of my invention require no further elucidation.

It is obvious that changes in details of construction may be made without departing from the spirit of my invention.

Having thus fully described my invention, what I claim is—

1. In a machine of the class described, a cloth folding device, a device for indicating the length and number of the folds of cloth, said folding device and said indicating device being operated by said machine, and an automatic stop motion operated by the cloth in transit.

2. In a machine of the class described, a cloth folding device, means for indicating the length of the folds of cloth, comprising a graduated indicating-plate, a rotatable ratchet disk adjacent to said plate, having a hub, a stud extending through said hub and graduated plate, a spring engaging said stud and hub, a rod connected to said machine and provided with a pawl at one end thereof engaging said ratchet disk, and a pawl engaging the disk to prevent rotation in the reverse direction.

3. In a machine of the class described, a cloth folding device, means for indicating the length of the folds of the cloth, comprising a ratchet disk provided with a hub, an indicating plate revoluble with said disk, means for operating the folding device and means for rotating said disk and indicating-plate, said means being connected to a revoluble member on the machine, a finger engaging the periphery of said hub and connected to the means for rotating the disk to engage and disengage said finger with said hub.

4. In a machine of the class described, a reciprocating cloth carrier, means for indicating the length of the folds of the cloth, means for reciprocating the cloth folding device and means for rotating the indicating device, and an automatic stop motion operated by the cloth in transit to the cloth carrier.

5. In a machine of the class described, a cloth folding device, means for indicating the length of the folds of the cloth, means for operating the cloth carrier, means for rotating the indicating device, and a pair of bars between which the cloth travels toward the folding device, and means for separating said bars for the purpose described.

6. In a machine of the class described, a cloth folding device, means for indicating the length of the folds of the cloth, means for operating the cloth folding device, and a stop motion comprising a pair of bars crossing the machine and between which the cloth travels, one of which bars is separable from the other to allow seams of cloth to pass, means for applying pressure to one of said bars, and means for separating the bars.

In testimony whereof I affix my signature, in presence of two witnesses.

KIT VON THIGPEN.

Witnesses:
HILL HUNTER,
A. N. STILL.